United States Patent
Bradbury et al.

(10) Patent No.: US 10,180,337 B1
(45) Date of Patent: Jan. 15, 2019

(54) OPTICAL DEFORMATION DETECTION SENSOR AND SYSTEM HAVING A MATERIAL DISPOSED ON THE INNER SURFACE OF AN ELONGATED HOLLOW HOUSING

(71) Applicant: INTERNATIONAL BUSINESS MACHINES CORPORATION, Armonk, NY (US)

(72) Inventors: Jonathan Bradbury, Poughkeepsie, NY (US); Jonathan Fry, Fishkill, NY (US); Michael Kane, Hopewell Junction, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/646,138

(22) Filed: Jul. 11, 2017

(51) Int. Cl.
*G01D 5/353* (2006.01)

(52) U.S. Cl.
CPC ....... *G01D 5/35303* (2013.01); *G01D 5/3539* (2013.01); *G01D 5/35387* (2013.01); *G01D 5/35393* (2013.01)

(58) Field of Classification Search
CPC .... G01D 5/35303; G01D 5/268; G01D 5/353; G01K 11/32; G01M 11/083; G01M 3/047; G01M 11/086; G02B 6/4289; G01L 5/0052; G01L 11/025
USPC .................................................. 250/227.14
See application file for complete search history.

(56) References Cited

U.S. PATENT DOCUMENTS

| | | | |
|---|---|---|---|
| 4,654,520 A | * | 3/1987 | Griffiths ................ G01B 11/18 250/227.14 |
| 5,131,062 A | | 7/1992 | Eide et al. |
| 6,094,144 A | | 7/2000 | Dishongh et al. |
| 6,366,209 B2 | | 4/2002 | Dishongh et al. |

(Continued)

FOREIGN PATENT DOCUMENTS

EP    1672351 A2    6/2006

OTHER PUBLICATIONS

Garcia et al., "Vibration Detection Using Optical Fiber Sensors", Review Article, Hindawi Publishing Corporation, Journal of Sensors, vol. 2010, Article ID 936487, Mar. 1, 2010, pp. 1-13.

(Continued)

*Primary Examiner* — Que T Le
(74) *Attorney, Agent, or Firm* — Teddi E. Maranzano

(57) ABSTRACT

An optical sensor and a deformation detection system in which the optical sensor is used. The optical sensor includes an optical fiber, an elongated hollow housing having an interior portion, and a material disposed on an inner surface of the housing that produces a persistent change in an optical signal transmission property of the optical fiber when the optical fiber contacts the material. The optical fiber elastically extends between opposing ends of the housing such that a bending deformation of the housing beyond a threshold radius of curvature causes a contact to occur between the material and the optical fiber. The contact results in persistent change in the optical signal transmission property of the optical fiber, which can be detected to determine whether deformation of the device occurred beyond a predetermined threshold value. The deformation detection system can use one or more of the optical sensors attached to the device.

19 Claims, 5 Drawing Sheets

(56) References Cited

U.S. PATENT DOCUMENTS

| | | |
|---|---|---|
| 6,452,502 B1 | 9/2002 | Dishongh et al. |
| 6,559,437 B1 | 5/2003 | Pope, Jr. et al. |
| 6,869,266 B2 | 3/2005 | Coomer et al. |
| 6,915,183 B2 | 7/2005 | Iida et al. |
| 7,741,834 B2 | 6/2010 | Dang et al. |
| 8,845,969 B2 | 9/2014 | Bangera et al. |

OTHER PUBLICATIONS

Glaesemann, et al., "The Mechanical Reliability of Corning® Optical Fiber in Bending", White Paper, Corning Incorporated, Sep. 2002, 4 pages, WP3690, Corning, NY.

\* cited by examiner

OPTICAL DEFORMATION DETECTION SENSOR AND SYSTEM HAVING A MATERIAL DISPOSED ON THE INNER SURFACE OF AN ELONGATED HOLLOW HOUSING

BACKGROUND

The present invention relates generally to the field of optical waveguide sensors, and more particularly to an optical waveguide sensor and system for detecting or measuring an occurrence of an object's deformation.

Deformation of an object such as a device may inadvertently occur during shipping or handling. Detection of the deformation may enable determination as to whether damage has occurred as a result.

SUMMARY

For legal reasons, this section is a restatement of the independent claims, below, in prose form.

BRIEF DESCRIPTION OF THE DRAWINGS

The following detailed description, given by way of example and not intended to limit the invention solely thereto, will best be appreciated in conjunction with the accompanying drawings.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
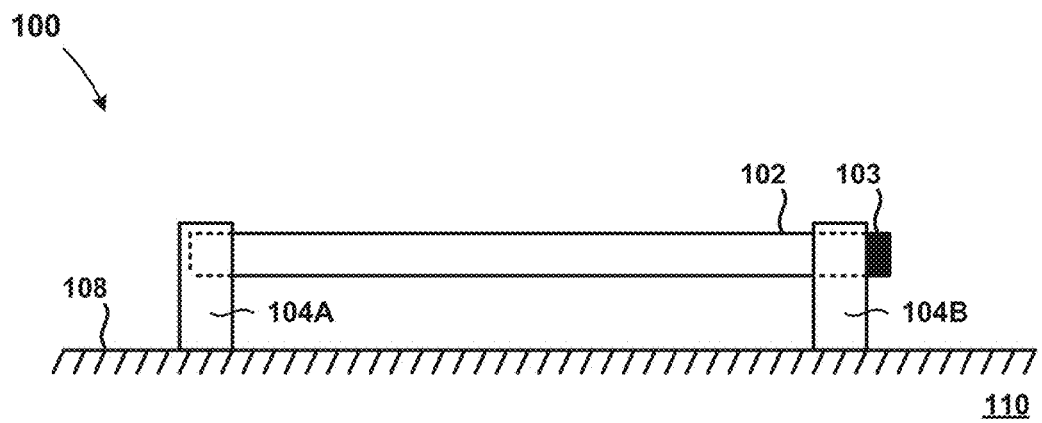
FIG. 1 depicts a schematic sectional view of an optical deformation detection sensor, in accordance with an embodiment of the present invention.

Detailed embodiments of the present invention are disclosed herein for purposes of describing and illustrating claimed structures and methods that may be embodied in various forms, and are not intended to be exhaustive in any way, or limited to the disclosed embodiments. Many modifications and variations will be apparent to those of ordinary skill in the art without departing from the scope and spirit of the disclosed embodiments. The terminology used herein was chosen to best explain the principles of the one or more embodiments, the practical application or technical improvement over current technologies, or to enable those of ordinary skill in the art to understand the embodiments disclosed herein. As described, details of well-known features and techniques may be omitted to avoid unnecessarily obscuring the embodiments of the present invention.

References in the specification to "one embodiment", "an embodiment", "an example embodiment", or the like, indicate that the embodiment described may include one or more particular features, structures, or characteristics, but it shall be understood that such particular features, structures, or characteristics may or may not be common to each and every disclosed embodiment of the present invention herein. Moreover, such phrases do not necessarily refer to any one particular embodiment per se. As such, when one or more particular features, structures, or characteristics is described in connection with an embodiment, it is submitted that it is within the knowledge of those skilled in the art to affect such one or more features, structures, or characteristics in connection with other embodiments, where applicable, whether or not explicitly described.

For purposes of the description hereinafter, the terms "upper", "lower", "right", "left", "vertical", "horizontal", "top", "bottom", "perpendicular", "parallel", and the like, and any derivatives thereof, shall relate to the disclosed structures and methods, as oriented in the drawing figures. The terms "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating, or semiconductor layers at the interface of the two elements.

In the interest of not obscuring disclosure of embodiments of the present invention, the following detailed description may contain certain processing steps or operations that are known in the art which may have been combined for purposes of clear description and illustration. In some instances certain processing steps or operations that are known in the art may not be described in detail, and/or may not be described at all. It shall be understood that the following disclosure of embodiments of the present invention is relatively focused on distinctive elements, features, structures, or characteristics thereof.

For certain types of devices, exceeding deformation tolerances may result in damage. Embodiments of the present invention are directed to an optical deformation detection sensor and system for detecting an occurrence of a deformation event in which a device's deformation tolerance has been exceeded. In certain embodiments, the sensor and system can further determine an extent to which the deformation occurred.

In the disclosed embodiments of the present invention, the optical deformation detection system can include one or more optical sensors which can be attached to a device. An initial reading indicative of a non-deformed condition of the device is taken by the one or more optical sensors, and is received and used to generate and associate an initial characteristic data signature to the device. A later reading indicative of a later condition of the device is taken by the one or more optical sensors, and is received and used to generate and associate a later characteristic data signature to the device. An occurrence of a deformation event in which the device's deformation tolerance has been exceeded can be detected on the basis of differences between the initial and later characteristic data signatures, which may be indicative of an extent to which the deformation occurred. Where the differences exceed a predetermined threshold value, the event can be detected, and a determination can be made as to whether damage to the device occurred as a result of the event.

FIG. 1 depicts a schematic sectional view of an optical deformation detection sensor 100, in accordance with an embodiment of the present invention. The optical deformation detection sensor 100 includes optical sensor 102, optical coupling 103, and sensor mounts 104A-B, for attachment to a surface 108 of device 110.

In embodiments of the present invention, the device 110 represents any device for which it is desirable to detect a deformation event, in accordance with the embodiments of the invention. In an embodiment, the device 110 represents, for example, an electronic device such as a printed circuit board, semiconductor chip or wafer, integrated circuit, or the like. Generally, deformation of the device 110 may be caused by one or more forces applied to the device 110. The device 110 may include areas or portions of varying stiffness. An occurrence of a deformation event in which a deformation tolerance of the device 110 is exceeded may result in damage to the device 110.

The sensor mounts 104 represent, for example, spacers or standoff bolts, which may be used to attach the optical sensor 102 to the device 110, such that deformation of the device 110 causes a corresponding deformation of the optical sensor 102, as described in further detail below. Each of the sensor mounts 104 may be attached at an end to the optical sensor 102, and at another end to the surface 108 of the device 110. The sensor mounts 104 may rigidly fix the ends of the optical sensor 102 so as to prevent rotation or translation. The sensor mounts 104 may be electrically insulated or non-conductive. The sensor mounts 104 may facilitate physical or optical coupling of the optical sensor 102 and the optical coupling 103. In various embodiments, adhesives such as in the form of thermosetting resins, epoxies, or polymers, or thermoplastic or hot-melt adhesives, may be used instead of the sensor mounts 104 to fixedly attach the optical sensor 102 to the device 110. Generally, any type of attachment of the optical sensor 102 to the device 110 to allow for the optical sensor 102 to deform as the device 110 deforms may be used, where the choice of any particular type may be a matter of design choice. In various embodiments, the sensor mounts 104 may fix the ends of the optical sensor 102 with a degree of "play," such that a degree of deformation of the device 110 may occur before corresponding deformation of the optical sensor 102 occurs.

Figure 2:
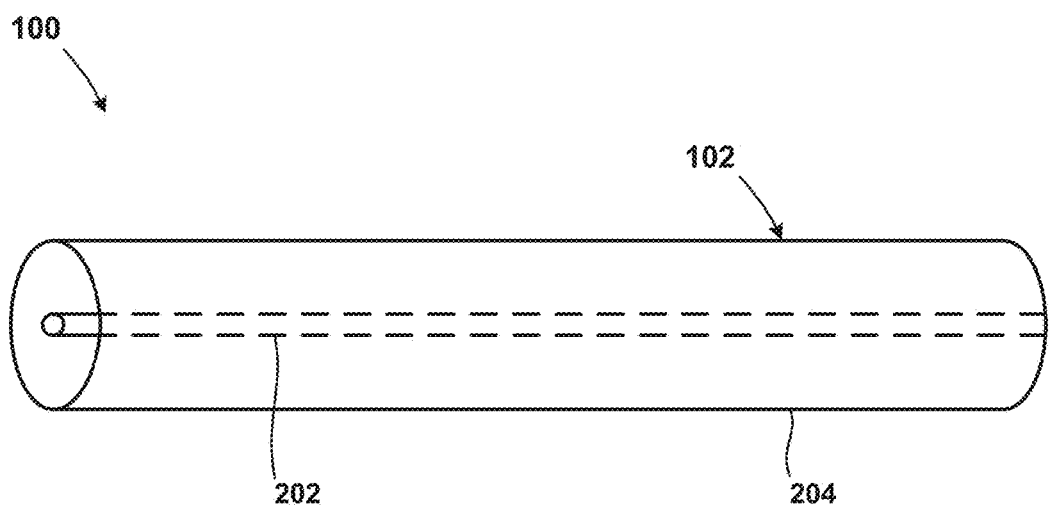
FIG. 2 depicts a schematic section view of a portion of an optical sensor of the optical deformation detection sensor of FIG. 1, in accordance with an embodiment of the present invention.

FIG. 2 depicts a schematic section view of a portion of the optical sensor 102 of the optical deformation detection sensor 100 of FIG. 1, in accordance with an embodiment of the present invention. The optical sensor 102 includes an optical fiber 202 and an outer tube 204.

In an embodiment of the present invention, the optical fiber 202 represents a single modal or multimodal optical fiber, optical waveguide, or optical thread. The optical fiber 202 includes a glass or plastic core portion with optical transmission properties such as one or more refractive indices, which may affect transmission, absorption, or reflection of optical signals or light propagated by the optical fiber 202, as a function of various factors described in further detail below. In various embodiments, the core portion can further include components such as cladding or one or more coatings or sheaths, which can be chosen to affect total internal reflection of the optical fiber 202. The total internal reflection of the optical fiber 202 is defined in part by the one or more refractive indices present about its circumferential boundaries. In embodiments, the one or more refractive indices of the optical fiber 202 is affected as a result of contact with a material such as a corrosive material or dye, as described in further detail below.

The optical fiber 202 is used in conjunction with the coupling 103 to receive and propagate optical signals. The optical fiber 202 can be mounted using, for example, optical fiber mounts, which can be coupled to a housing such as the outer tube 204, by press-fit, threading, magnetic or electromagnetic force, or the like. The optical fiber 202 can be mounted taut to elastically extend between opposing ends of the outer tube 204, as described in further detail below, in order to receive the material as a result of the contact during deformation of the outer tube 204. In various embodiments, the optical fiber 202 can be mounted, for example, concentrically at each of its ends with respect to the outer tube 204, and can optionally include one or more additional mounting points positioned along a length of the optical fiber 202. The additional mounting points may enable use of the optical sensor 102 as two or more discrete sensors, each including a "detection deformation zone" defined by consecutive pairs of mounting points, to effectively produce a series of discrete optical sensors formed of the optical fiber 202.

In an embodiment of the present invention, the outer tube 204 represents a hollow housing or shell that includes a circular cross section with an inner and outer diameter. The outer tube 204 may have a particular stiffness which may be chosen as a function of its overall geometry, and the materials used in its fabrication, to allow for the optical sensor 102 to deform as the device 110 deforms, as previously described. More particularly, the stiffness may be such so as to allow for bending of the optical sensor 102 to occur as bending of the device 110 occurs. In various embodiments, the outer tube 204 can include other cross sectional shapes including, for example, elliptical, square, rectangular, or the like. Generally, the outer tube 204 can include any cross sectional shape in accordance with embodiments of the invention, where selection may be a matter of design choice. In various embodiments, the outer tube 204 can include a cross sectional shape that varies in area longitudinally as a function of its length. For example, the outer tube 204 may have a frustum shape which may be designed so as to affect an extent of the material received by the optical fiber 202 as a result of the contact.

Figure 3:
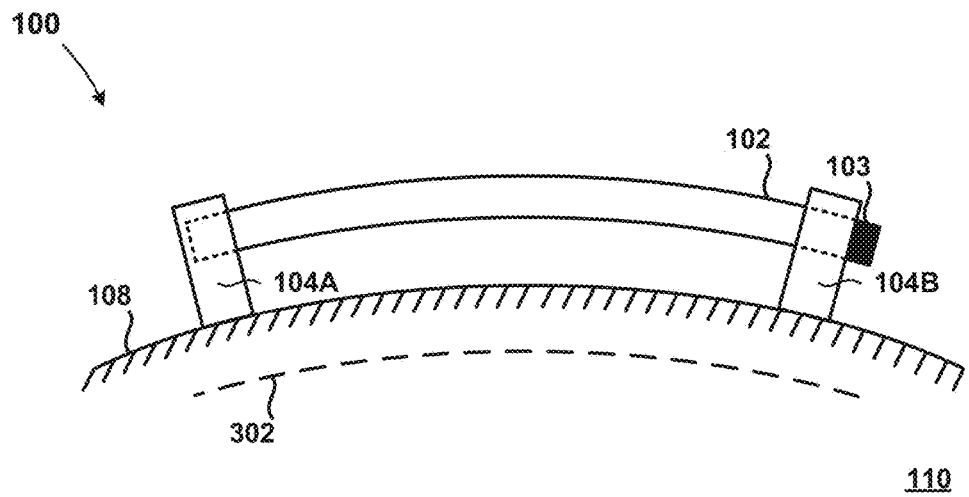
FIG. 3 depicts the schematic sectional view of the optical deformation detection sensor of FIG. 1, in accordance with an embodiment of the present invention.

FIG. 3 depicts the schematic sectional view of the optical deformation detection sensor 100 of FIG. 1, in accordance with an embodiment of the present invention. The optical deformation detection sensor 100 is depicted in a deformed condition corresponding to the deformed condition of the surface 108.

In embodiments of the present invention, the deformation of the device 110 results in one or more applied forces to the optical sensor 102 by the device 110, applied by way of the sensor mounts 104. The deformation of the device 110 may manifest in the form of, for example, an arc having an associated bend radius 302. The bend may be exhibited about an axis parallel to the surface 108. As may be appreciated by those of skill in the art, the degree to which deformation of the optical sensor 102 corresponds to deformation of the device 110 may be defined as a function of a relative orientation of the optical sensor 102 with respect to the device 110. For example, the deformation of the optical sensor 102 may correspond closely to the deformation of the device 110 when a longitudinal axis of the optical sensor 102 is oriented perpendicularly with respect to the axis of the bend radius 302.

Figure 4:
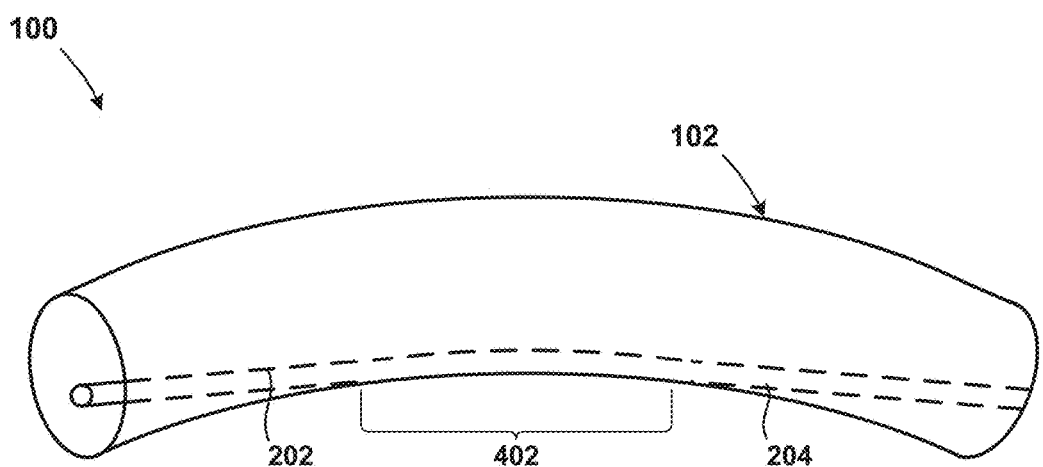
FIG. 4 depicts a schematic section view of a portion of the optical sensor of the optical deformation detection sensor of FIG. 3, in accordance with an embodiment of the present invention.

FIG. 4 depicts a schematic section view of a portion of the optical sensor 102 of the optical deformation detection sensor 100 of FIG. 3, in accordance with an embodiment of the present invention. The optical sensor 102 is depicted in the deformed condition as depicted in FIG. 3, in which an inner surface of the outer tube 204 is in contact with a portion of the optical fiber 202 across a contact area 402.

In embodiments of the present invention, the optical fiber 202 can be mounted taut to elastically extend between opposing ends of the outer tube 204. The elastic extension allows for elastic bending of the optical fiber 202, caused by applied forces about the contact area 402 as a result of contact with the inner surface of the outer tube 204 during deformation of the optical sensor 102. The degree to which elastic bending occurs may depend on the relative orientation of the optical sensor 102 with respect to the device 110, as previously described An allowable bend radius of the optical fiber 202 may be defined as a deformation of the optical fiber 202 which includes an arc having a minimum bend radius, below which breakage of the optical fiber 202 may occur. The allowable bend radius may depend, for example, upon the type of the optical fiber 202 used, a bending or tensile strength of the optical fiber 202, the length of the optical fiber 202, and/or whether or not the core portion of the optical fiber 202 includes cladding or one or more coatings or sheaths. A type of the optical fiber 202 can be chosen as a matter of design choice to accommodate the particular application of the optical sensor 102, particularly with respect to characteristics of the device 110. For example, the type can be chosen according to a length or area across which deformation of the device 110 is to be detected, and a maximum amount of deformation expected of the device 110 before damage occurs. The maximum amount of deformation can be defined as a minimum size of the bend radius 302.

In embodiments of the present invention, an interior portion of the outer tube 204 can be coated with a material such as a corrosive material. The material can be disposed on an entire or partial portion of the interior portion for disposition on to the optical fiber 202 upon contact about the contact area 402. The disposition of the material on the optical fiber 202 produces changes in the optical transmission properties of the optical fiber 202. The changes may be caused by local corrosion by the corrosive material of the optical fiber 202, and may include changes to the one or more refractive indices of the optical fiber 202. In various embodiments, the corrosive material can be an acidic solution or organic solvent, capable of corroding or dissolving glass or plastic in a predictable manner, for example, such as by corroding at a constant rate. For example, the acidic solution can be a hydrofluoric acid (HF) solution, and the organic solvent can be dichloromethane or methylene chloride (DCM). In various embodiments, a dye can be used in place of the corrosive material to change the optical transmission properties of the optical fiber 202 upon contact.

In various embodiments of the present invention, where the optical fiber 202 includes only a glass or plastic core portion, corrosion of the optical fiber 202 affects material properties of the core portion and as a result, affects transmission, absorption, or reflection of propagated optical signals by the optical fiber 202. For example, the corrosion may reduce transmission and increase absorption and reflection of propagated optical signals by the optical fiber 202. In various embodiments, where the core portion further includes components such as cladding or one or more coatings or sheaths, corrosion may affect total internal reflection of the optical fiber 202 as a function of materials chosen to form the components, and the types and natures of chemical reactions associated with the corrosion. In various embodiments, where the dye is used in place of the corrosive material, the optical transmission properties including the total internal reflection of the optical fiber 202 may be affected upon contact and interaction with the dye. For example, the dye may increase the total internal reflection of the optical fiber 202 upon contact about the contact area 402, by changing a refractive index present about one or more circumferential boundaries of the optical fiber 202.

An entire or partial portion of the interior portion of the outer tube 204 can be coated according to an extent of the contact area 402 that is expected to occur as a result of deformation of the device 110. As may be appreciated by those of skill in the art, an extent of the interior portion to be coated may be chosen to accommodate the particular application of the optical sensor 102, with respect to characteristics of the device 110. For example, the extent of the coating can be chosen according to a length or area across which deformation of the device 110 is to be detected, and a maximum amount of expected deformation of the device 110 before damage occurs, as previously described. In various embodiments, where the outer tube 204 has a frustum shape as previously described, an extent of the contact about the contact area 402 may vary as a function of a relative position and orientation of the bend radius 302, with respect to a position and orientation of the outer tube 204. As may be appreciated, the relative positioning and orientation may affect levels of sensitivity of the optical sensor 102 to vary the sensitivity longitudinally, by varying an extent of the contact area 402 that is produced, as a function of a position about which the contact occurs along a length of the optical sensor 102. For example, the sensitivity may be designed to vary as a function of a length of the optical sensor 102. An extent of the disposition of the material on the interior portion of the outer tube 204 can be chosen as a matter of design choice.

In embodiments of the present invention, the optical fiber 202 can receive and propagate optical signals transmitted by an optical signal source. The optical fiber 202 may transmit, absorb, and/or reflect portions of the propagated optical signals. Generally, the transmitted, absorbed, and reflected portions of the propagated optical signals can be affected or determined by a condition of the optical fiber 202. The condition can be defined in terms of the distribution of the one or more refractive indices present along the length or about the circumferential boundaries of the optical fiber 202, which can be affected by the corrosion of the optical fiber 202, as previously described. The transmitted, absorbed, and reflected portions of the propagated optical signals can be affected in terms of particular wavelengths or intensities of the propagated optical signals. As such, the optical fiber 202 may generally act as an optical filter, which can vary in behavior according to the condition of the optical fiber 202.

In various embodiments of the present invention, the corrosion of the optical fiber 202 may be rate-limited by mounting of the optical fiber 202 to elastically extend within an hermetically sealed interior portion of the outer tube 204. The interior portion can be filled with one or more inert gases, chosen according to types and natures of chemical reactions associated with the corrosion. As may be appreciated by those of skill in the art, higher accuracy as to an extent and rate of the deformation of the optical sensor 102 that occurs as a result of the deformation of the device 110 can be achieved as a function of an amount of impurities included in the chemical reactions that occur as a result of the contact.

Generally, deformation of the device 110 may be caused by one or more applied forces to the device 110. As may be appreciated by those of skill in the art, the one or more applied forces may also result in bending, shear, compressive, tensile, and/or torsional stresses that may be experienced by the device 110. In various embodiments, the stresses experienced by the device 110 may be deduced from the corresponding determined extent of the deformation of the device 110.

Figure 5:
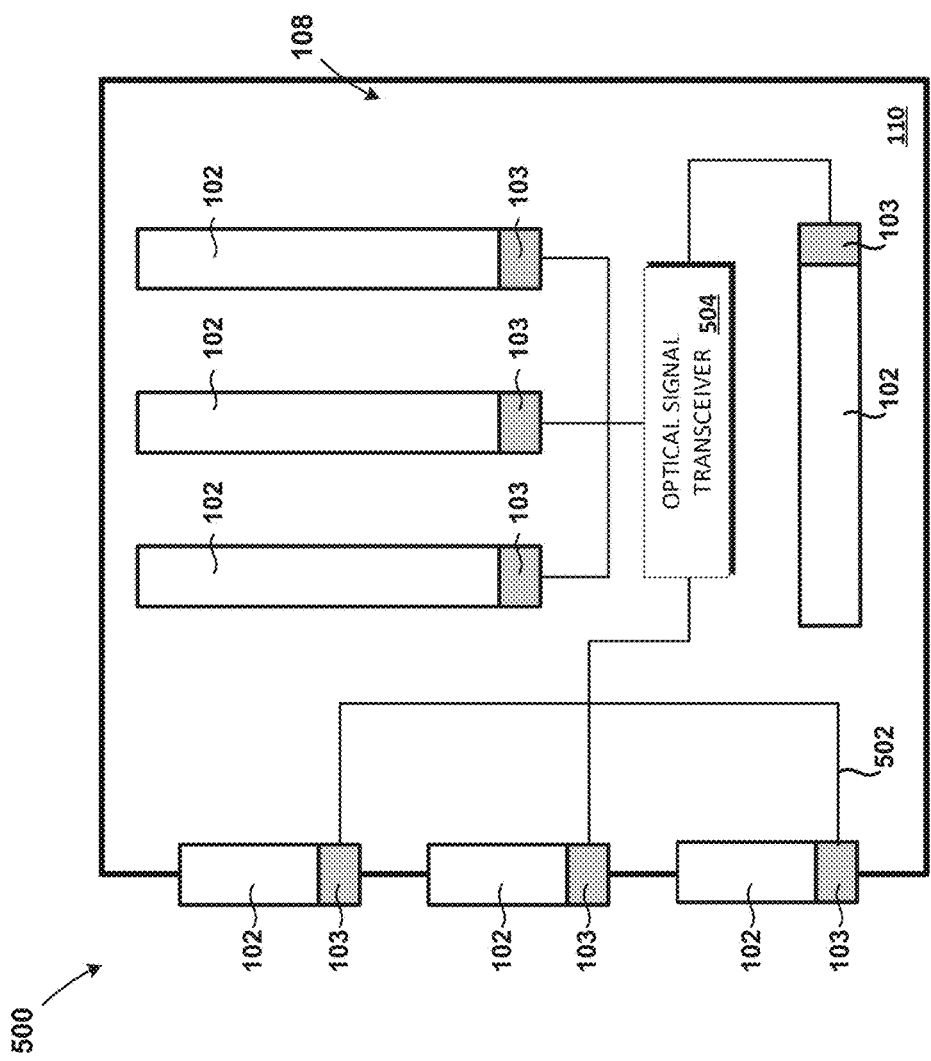
FIG. 5 depicts a functional block diagram of an optical deformation detection sensor array, in accordance with an embodiment of the present invention.

FIG. 5 depicts a functional block diagram of an optical deformation detection sensor array 500, in accordance with an embodiment of the present invention. The optical deformation detection sensor array 500 includes optical sensors 102 and couplings 103, all interconnected by optical connections 502 to optical signal transceiver 504. The optical sensors 102 can be mounted to the device 110, as described above.

In an embodiment of the present invention, the optical signal transceiver 504 represents automated test equipment such as in the form of a device which transmits and subsequently receives, detects, or otherwise takes readings of optical signals, as previously described. The optical signal transceiver 504 can include, for example, one or more microprocessors allowing it to detect optical signals and to process the signals to generate digital data packets such as network or data packets. The optical signal transceiver 504 can include network communications capability allowing it to transmit the data packets over a network to a computing unit.

In an embodiment of the present invention, the optical signal transceiver 504 may include an optical signal source, an optical signal detector, a microprocessor, and optionally, a power supply. In various embodiments, the optical signal transceiver 504 can be powered by an external source such as one that may form a part of an automated testing stand. The optical signal transceiver 504 can include optical couplings such as the coupling 103, which can be used to connect the optical sensors 102 to the optical signal transceiver 504 by way of the optical connections 502. The optical connections 502 can be single-modal or multimodal optical fibers, and can be chosen in accordance with the types used for the optical fibers 202. An optical circuit may be created using each of the optical sensors 102, couplings 103, optical connections 502, the optical signal source, and the optical signal detector. The optical sensors 102 can be connected by the couplings 103 to the optical signal source and the optical signal detector. The optical signal transceiver 504 can include one or more of the optical signal sources and detectors.

The optical signal source may transmit light to the optical sensors 102 for subsequent reception by the optical signal detector. Generally, the optical signal source and the optical signal detector can be chosen according to the type of the optical fiber 202 used in the optical sensors 102. For example, where the optical fiber 202 is a multi-mode optical fiber, the optical signal source can include light-emitting diodes (LEDs), laser-emitting diodes, or semiconductor laser diodes, which may emit light in the range of 850 to 1300 nanometer (nm) wavelength. The optical detector may include semiconductor photodiodes, semiconductor positive-intrinsic-negative (PIN) photodiodes, avalanche photodiodes, or the like. The optical signal detector may characterize received optical signals in terms of a wavelength spectra of the received optical signals, and/or in terms of the intensity of the received optical signals. For example, A laser diode emitting light at a wavelength of 635 nm and 1 mWatt power output is available from Thorlabs, Newton, N.J. A PIN photodiode that detects wavelengths near 600 nm and converts photons to an electrical signal with an approximate responsivity of 0.50 A/W (amperes/watt) is available from Silicon Sensor International AG, Berlin, Germany.

In various embodiments of the present invention, the optical sensors 102 of the optical deformation detection sensor array 500 may be arranged with respect to the device 110 to allow for the deformation of the optical sensors 102 to correspond with and occur as the deformation of the device 110 occurs. The outer tubes 204 of the optical sensors 102 may include a stiffness to provide a certain amount of structural support to the device 110, while still allowing for corresponding deformation of the optical sensors 102 to occur as deformation of the device 110 occurs. For purposes of illustration with respect to the present disclosure only, the optical sensors 102 are arranged about the surface 108 of the device 110 to illustrate an example arrangement of the optical sensors 102 with respect to the device 110 and are not intended to imply or suggest a particular pattern of arrangement. As such, the arrangement of the optical sensors 102 with respect to the device 110 can be chosen as a matter of design choice.

In embodiments of the present invention, the optical signal transceiver 504 may transmit and subsequently receive optical signals with respect to each of the optical sensors 102. The received optical signals may be used to generate, before contact, initial characteristic data signatures corresponding to neutral states of the optical sensors 102. The received optical signals may be used to subsequently generate, after the contact, later characteristic data signatures corresponding to deformed conditions of the optical sensors 102. The deformation experienced by the optical sensors 102 may be used to determine a corresponding deformation of the device 110. The characteristic data signatures may be generated in terms of amounts of transmitted, absorbed, and reflected portions of the received optical signals, which may include variable characteristics or properties in accordance with an amount of corrosion, or otherwise changed optical transmission properties of the optical sensors 102, that may occur as a result of the deformation of the device 110. The characteristic data signatures can be associated with each of the optical sensors 102.

A determination as to an extent to which deformation of the device 110 occurred can be determined based on differences between the initial and later characteristic data signatures. For example, the amount and nature of the corrosion experienced by each of the optical fibers 202 depends on the amount and nature of the deformation experienced by the device 110. As such, the received portions of the optical signals vary as a function of the deformation of the device 110. In an embodiment of the present invention, the characteristic data signatures associated with each of the optical sensors 102, respectively, can be used to map amounts of deformation of each of the optical sensors 102 to corresponding positions of deformations of the device 110, for example, by associating locations of each of the optical sensors 102 to corresponding portions of the device 110.

In various embodiments of the present invention, after generating the initial characteristic data signatures, deformation can be detected by the optical sensors 102 in an unpowered or unenergized state of the optical deformation detection sensor array 500, as the corrosive material or the dye, as the case may be, may affect changes to the optical transmission properties of each optical fiber 202 regardless of power state. When generation of a later characteristic data signature is required, the optical deformation detection sensor array 500 can be powered to allow for transmission and subsequent receiving of optical signals by the optical signal transceiver 504 to and from each of the optical sensors 102. The extent to which deformation of the device 110 occurred can then be determined.

In embodiments of the present invention, the optical sensors 102 may be reused a number of times by, for example, defining the later characteristic data signature generated from a first deformation detection cycle to be representative of an initial characteristic data signature for a second deformation detection cycle. Generally, reuse of the optical sensors 102 may be limited by the sensitivity of the optical detector and the condition of the optical fiber 202, and may continue as long as an occurrence of a deformation event in which a deformation tolerance of the device 110 has been exceeded can be detected on the basis of differences between the initial and later characteristic data signatures.

Figure 6:
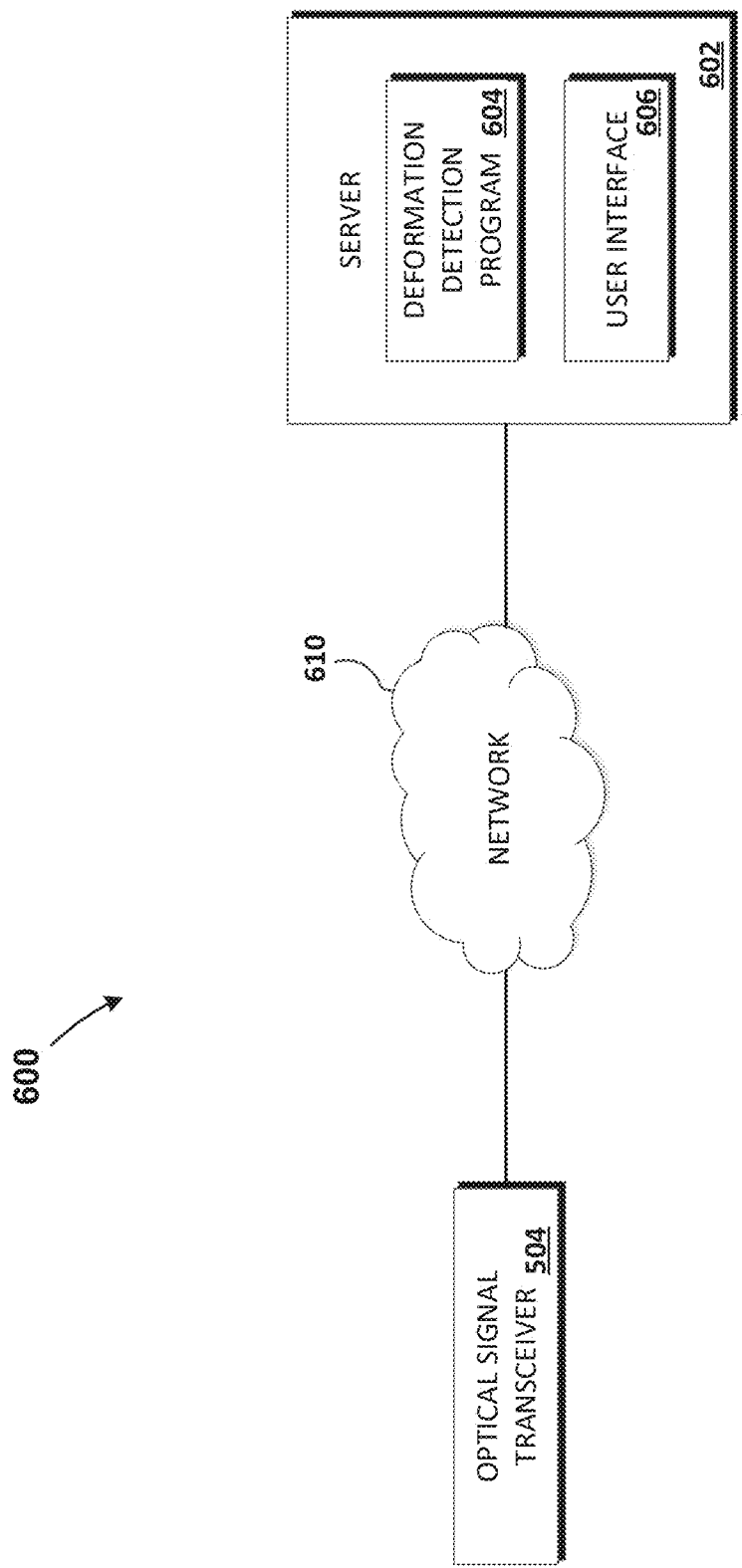
FIG. 6 is a functional block diagram depicting an optical deformation detection system, in accordance with an embodiment of the present invention.

FIG. 6 is a functional block diagram depicting an optical deformation detection system 600, in accordance with an embodiment of the present invention. Deformation monitoring system 600 includes the optical signal transceiver 504 and server 602, interconnected over a network 610.

In various embodiments of the present invention, the network 610 can be, for example, an intranet, a local area network (LAN), a wide area network (WAN) such as the Internet, and include wired, wireless, or fiber optic connections. In general, the network 610 can be any combination of connections and protocols that will support communications between the optical signal transceiver 504 and the server 602, in accordance with embodiments of the present invention.

The server 602 represents a computing platform that hosts deformation detection program 604 and user interface 606. The server 602 may include internal and external hardware components as depicted and described in further detail below with reference to FIG. 7, below.

The deformation detection program 604, residing on the server 602, represents a computer program which receives and processes data generated by the optical signal transceiver 504, to detect occurrences of deformation events in which a deformation tolerance of the device 110 has been exceeded, on the basis of differences between the device's initial and later characteristic data signatures. The differences between the device's initial and later characteristic data signatures may be defined in terms of, for example, one or more predetermined threshold values, which may correspond to various design limits of the device 110, including, for example, a maximum amount of deformation that the device 110 may be expected to experience before damage occurs, which may be referred to as a deformation tolerance of the device 110. For example, an undeformed condition of the optical sensor 102 may be correlated with a corresponding undeformed condition of the device 110, and further, a deformed condition of the optical sensor 102 may be correlated with a corresponding deformed condition of the device 110. The deformed condition of the device 110 may be chosen to coincide, for example, with the maximum amount of deformation that the device 110 may be expected to experience before damage occurs. The differences between the device's initial and later characteristic data signatures may otherwise be defined in terms of other design limits of the device 110, which may be determine heuristically, for example, from an experimental bench testing environment, and may generally be defined as a matter of design choice.

The generated and associated initial and later characteristic data signatures may be indicative of the initial and later conditions of the device 110, respectively. The differences between the device's initial and later characteristic data signatures may be defined in terms of the information used to generate the characteristic data signatures, and may be based on information relating to the transmitted, absorbed, or reflected portions of the transmitted and subsequently received optical signals, as previously described. Generally, the information may include, for example, particular wavelengths or levels of intensity of the transmitted and subsequently received optical signals, and may be chosen as a matter of design choice.

The user interface 606, residing on the server 602, represents a computer program which receives and processes data from the deformation detection program 604, in order to display the received data, for example, by way of a graphical user interface, augmented or virtual reality interface, or the like.

Figure 7:
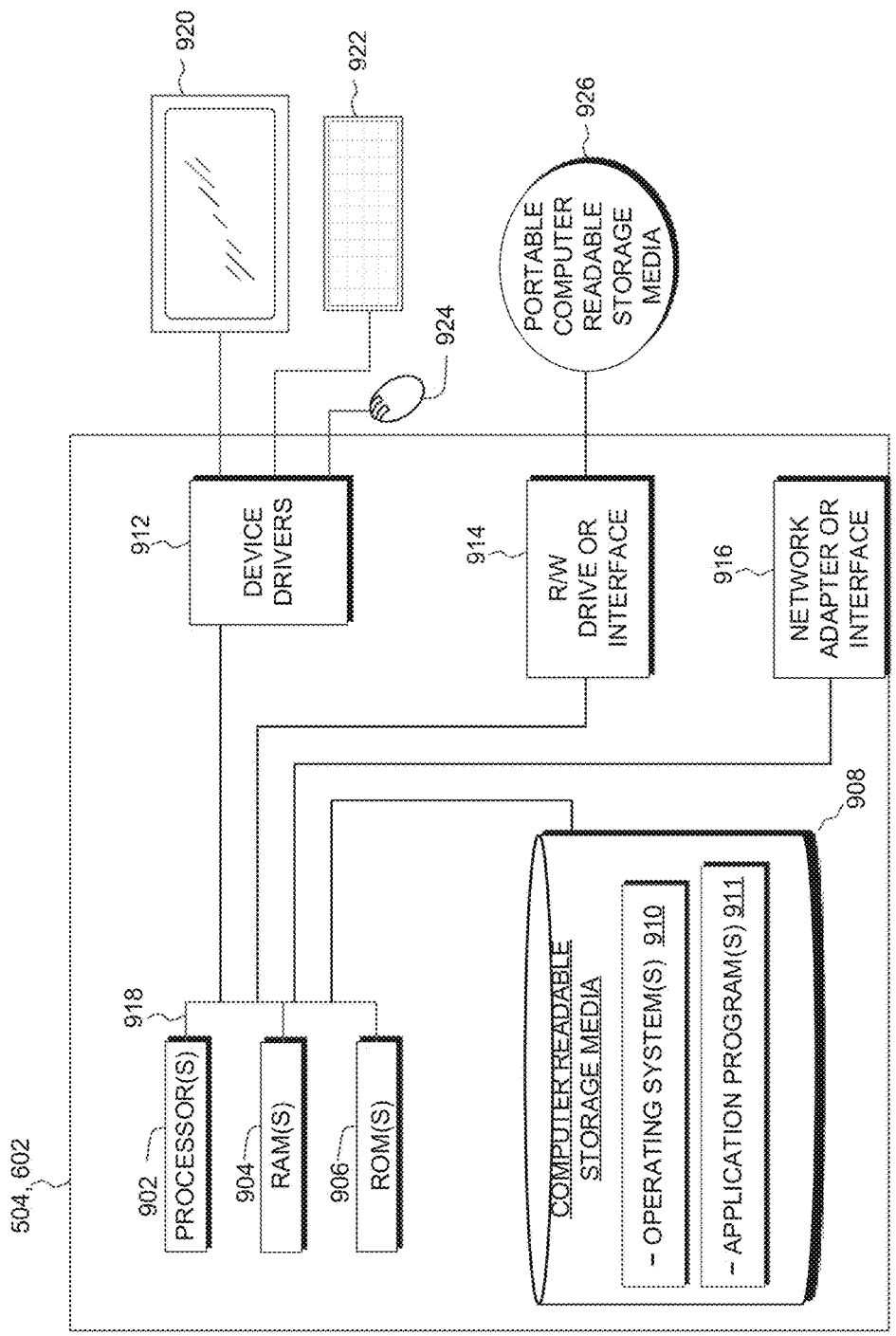
FIG. 7 is a block diagram depicting a computing device, in accordance with an embodiment of the present invention.

FIG. 7 is a block diagram depicting a computing device, in accordance with an embodiment of the present invention. As depicted in FIG. 7, the optical signal transceiver 504 or the server 602 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. The network adapter 916 communicates with a network 930. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, the deformation detection program 604, as depicted in FIG. 6, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The optical signal transceiver 504 or the server 602 may also include a R/W drive or interface 914 to read from and write to one or more portable computer readable storage media 926. Application programs 911 on the optical signal transceiver 504 or the server 602 may be stored on one or more of the portable computer readable storage media 926, read via the respective R/W drive or interface 914 and loaded into the respective computer readable storage media 908. The optical signal transceiver 504 or the server 602 may also include a network adapter or interface 916, such as a Transmission Control Protocol (TCP)/Internet Protocol (IP) adapter card or wireless communication adapter (such as a 4G wireless communication adapter using Orthogonal Frequency Division Multiple Access (OFDMA) technology). Application programs 911 on the optical signal transceiver 504 or the server 602 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers. The optical signal transceiver 504 or the server 602 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The optical signal transceiver 504 or the server 602 can be a standalone network server, or represent functionality integrated into one or more network systems. In general, the optical signal transceiver 504 or the server 602 can be a laptop computer, desktop computer, specialized computer server, or any other computer system known in the art. In certain embodiments, the optical signal transceiver 504 or the server 602 represents computer systems utilizing clustered computers and components to act as a single pool of seamless resources when accessed through a network, such as a LAN, WAN, or a combination of the two. This implementation may be preferred for data centers and for cloud computing applications. In general, the optical signal transceiver 504 or the server 602 can be any programmable electronic device, or can be any combination of such devices.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the one or more embodiment, the practical application or technical improvement over technologies found in the marketplace, or to enable others of ordinary skill in the art to understand the embodiments disclosed herein.

What is claimed is:

1. An optical sensor, comprising:
an optical fiber;
an elongated hollow housing having an interior portion defined by the inner surface and opposing ends of the hollow housing; and
a material disposed on the inner surface of the housing that will produce a persistent change in an optical signal transmission property of the optical fiber when the optical fiber contacts the material;
wherein:
the optical fiber elastically extends between the opposing ends of the housing such that a bending deformation of the housing beyond a threshold radius of curvature causes a contact to occur between the material and the optical fiber, resulting in the persistent change in the optical signal transmission property of the optical fiber.

2. The optical sensor of claim 1, further comprising an optical signal transceiver optically coupled to the optical fiber, wherein the optical signal transceiver transmits optical signals through the optical fiber, receives reflected optical signals from the optical fiber, and determines characteristics of the optical transmission property by analyzing the reflected optical signals.

3. The optical sensor of claim 1, further comprising sensor mounts attaching the optical sensor to a device, such that a deformation of the device causes an associated deformation of the housing.

4. The optical sensor of claim 1, wherein the material disposed on the inner surface is selected from the group consisting of: a corrosive material and a dye.

5. The optical sensor of claim 4, wherein the persistent change in the optical signal transmission property of the optical fiber is caused by corrosion of the optical fiber by the corrosive material, or by interaction of the dye with the optical fiber.

6. The optical sensor of claim 5, wherein the interior portion of the housing is hermetically sealed.

7. The optical sensor of claim 6, wherein the hermetically sealed interior portion of the housing is filled with one or more inert gases.

8. The optical sensor of claim 2,
wherein the optical signal transmission property is one or more properties selected from the list consisting of: a total internal reflection, and one or more refractive indices; and
wherein the optical signal transceiver detects the characteristics of the optical transmission property by analyzing one or more of: the wavelengths and levels of intensity of the transmitted, and received optical signals.

9. The optical sensor of claim 1, wherein the optical fiber is mounted within the interior portion of the elongated hollow housing by one or more optical fiber mounts that are coupled to the housing.

10. The optical sensor of claim 1, wherein the optical sensor comprises one or more deformation detection zones.

11. A deformation detection system comprising:
one or more optical sensors;
an optical signal transceiver; and
a computer system;
wherein:
each of the one or more optical sensors comprises:
an optical fiber;
an elongated hollow housing having an interior portion defined by the inner surface and opposing ends of the hollow housing; and
a material disposed on the inner surface of the housing that will produce a persistent change in an optical signal transmission property of the optical fiber when the optical fiber contacts the material;
wherein the optical fiber elastically extends between the opposing ends of the housing such that a bending deformation of the housing beyond a threshold radius of curvature causes a contact to occur between the material and the optical fiber, resulting in the persistent change in the optical signal transmission property of the optical fiber;
the optical signal transceiver is optically coupled to the optical fibers of the one or more optical sensors, and is operated to transmit optical signals through the optical fibers, receive reflected optical signals from the optical fibers, and detect characteristics of the optical transmission properties of the optical fibers by analyzing the reflected optical signals;
the computer system is operatively coupled to the optical signal transceiver, and is operated to receive, from the optical signal transceiver, a first data corresponding to first characteristics of the optical transmission properties of the optical fibers resulting from an analysis of first reflected optical signals occurring at a first time period, and a second data corresponding to second characteristics of the optical transmission properties of the optical fibers resulting from an analysis of second reflected optical signals occurring at a second time period, to identify a difference between the first data and the second data that exceeds a predetermined threshold value as a result of the contact between the material and the optical fiber, and to transmit an alert that a deformation beyond a predetermined threshold value has occurred.

12. The deformation detection system of claim 11, further comprising sensor mounts attaching each of the one or more optical sensors to a device, such that a deformation of the device causes an associated deformation of one or more of the housings of the one or more optical sensors.

13. The deformation detection system of claim 11, wherein the material disposed on the inner surface is selected from the group consisting of: a corrosive material and a dye.

14. The deformation detection system of claim 13, wherein the persistent change in the optical signal transmission property of the optical fiber is caused by corrosion of the optical fiber by the corrosive material, or by absorption of the dye into the optical fiber.

15. The deformation detection system of claim 14, wherein the interior portion of the housing is hermetically sealed.

16. The deformation detection system of claim 15, wherein the hermetically sealed interior portion of the housing is filled with one or more inert gases.

17. The deformation detection system of claim 12,
wherein the optical signal transmission property is one or more properties selected from the list consisting of: a total internal reflection, and one or more refractive indices; and
wherein the optical signal transceiver detects the characteristics of the optical transmission property by analyzing the wavelengths and levels of intensity of the transmitted and received optical signals.

18. The deformation detection system of claim 11, wherein the optical fiber is mounted within the interior portion of the elongated hollow housing by one or more optical fiber mounts that are coupled to the housing.

19. The deformation detection system of claim 11, wherein the one or more optical sensors each comprise one or more deformation detection zones.

* * * * *